(12) United States Patent
Szabo

(10) Patent No.: US 8,072,090 B2
(45) Date of Patent: Dec. 6, 2011

(54) PROCESS AND SYSTEM FOR GENERATING CONSUMABLE ENERGY

(75) Inventor: Joseph Szabo, Islip, NY (US)

(73) Assignee: Tishman Speyer IP Holdings, L.L.C., New York, NY (US)

( * ) Notice: Subject to any disclaimer, the term of this patent is extended or adjusted under 35 U.S.C. 154(b) by 452 days.

(21) Appl. No.: 12/368,825

(22) Filed: Feb. 10, 2009

(65) Prior Publication Data

US 2010/0201125 A1   Aug. 12, 2010

(51) Int. Cl.
*F03B 13/00* (2006.01)
(52) U.S. Cl. ......................................................... 290/54
(58) Field of Classification Search .................... 290/54, 290/43
See application file for complete search history.

(56) References Cited

U.S. PATENT DOCUMENTS

| | | | |
|---|---|---|---|
| 6,051,892 A | 4/2000 | Toal, Sr. | |
| 6,861,766 B2 * | 3/2005 | Rembert | 290/43 |
| 7,190,088 B2 | 3/2007 | Heidel | |
| 2009/0140523 A1 * | 6/2009 | DeAngeles | 290/43 |
| 2009/0293469 A1 * | 12/2009 | Chen | 60/398 |
| 2009/0314353 A1 * | 12/2009 | Vasshus et al. | 137/14 |

OTHER PUBLICATIONS

Energy Saving Trust, Discover Renewable Energy, Using Water To Make Your Own Electricity, Energy Saving Trust, http://www.energysavingtrust.org.uk/content/download/10152/37038/file/Hydroelectricity.pdf, p. 1, Mar. 2007, Energy Saving Trust, London.
Ontario Power Generation, "How it Works, Electricity Generation," http://www.opg.com/pdf/highschool.pdf, OPG Office Services, Ontario, CA, Dec. 1 2007.

* cited by examiner

*Primary Examiner* — Hanh N Nguyen

(57) ABSTRACT

A method of powering a multi-level structure is provided, which includes disposing a climate control system in the building. The system has a cooling tower, a fluid cooled chiller, a return line connecting an output of the chiller to an input of the cooling tower, and a condenser pump for pumping fluid therebetween. The system further includes a supply line connecting an output of the cooling tower to an input of the chiller, fluid being gravity fed from the cooling tower to the chiller. A turbine generator is disposed in the return line, the turbine generator being powered by fluid flowing through the return line. The method provides for transferring power generated from the turbine generator to a power supply for the structure.

20 Claims, 1 Drawing Sheet

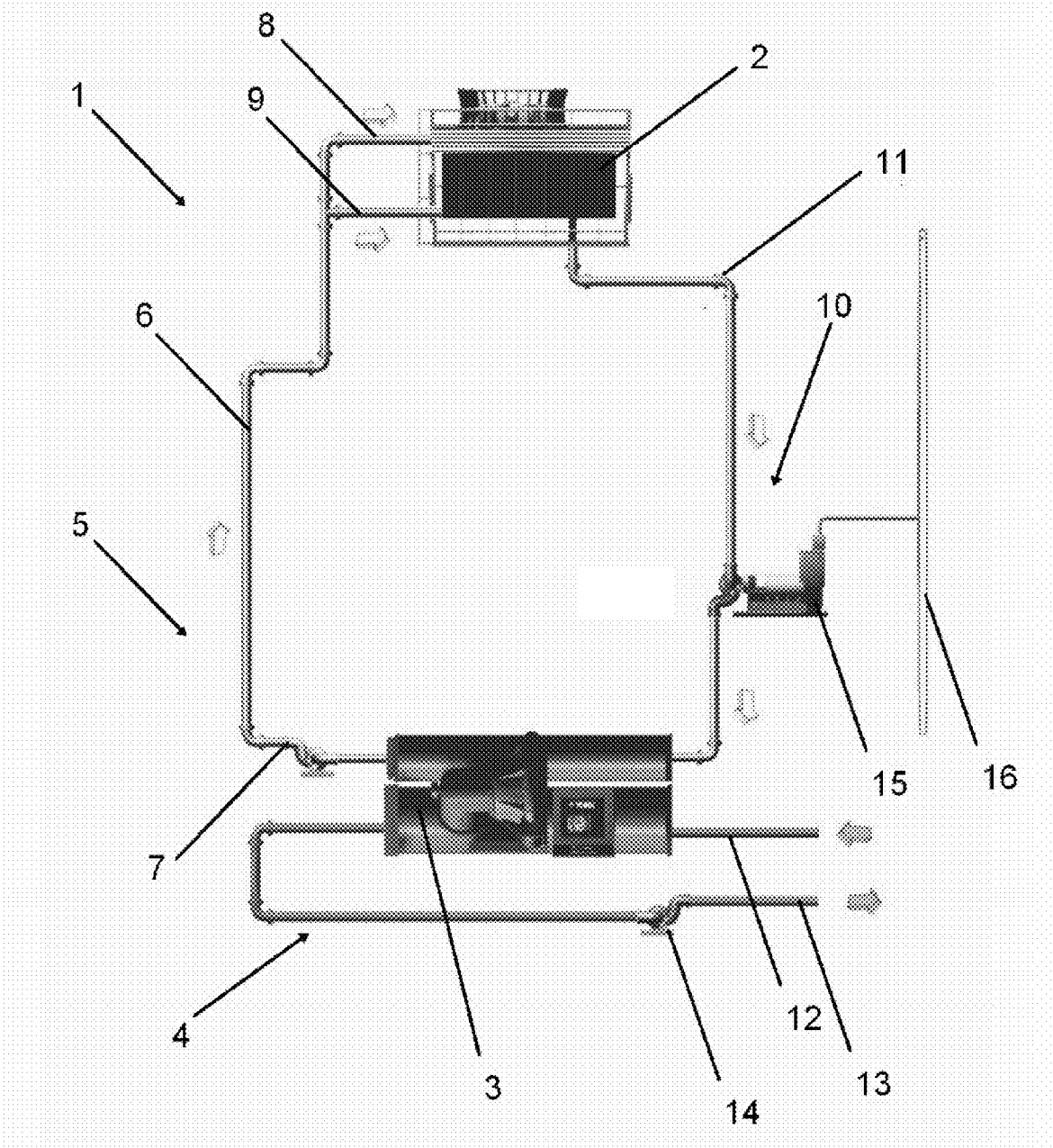

PROCESS AND SYSTEM FOR GENERATING CONSUMABLE ENERGY

BACKGROUND OF THE INVENTION

1. Field of the Invention

The present invention relates to integrating hydroelectric generators into climate control systems in buildings for generating electrical energy to be consumed by the building.

2. Description of the Prior Art

Known are processes for harnessing hydrodynamic power for generating electricity. One such example is U.S. Pat. No. 7,190,082 to Heidel, granted Mar. 13, 2007, for a "Process of Using Hydroelectric Turbines to Generate Electricity". This reference discloses attaching turbines to water mains, water towers, sewage lines, aqueducts and various pipelines. Kinetic energy of pressurized fluid traveling through these mediums is captured and changed to electric energy by means of a generator. This new electric energy is transferred to the nearest power station by means of a conduction pipe. Consumers can make their own electrical energy which they buy back from the utility companies.

U.S. Pat. No. 6,051,892 to Toal, Sr., granted Apr. 18, 2000, for a "Hydroelectric Power System" is another example of a process for harnessing hydrodynamic power for generating electricity. This reference discloses plural tanks vertically disposed. Water flows between tanks and a generator is disposed between each tank which are powered by the water flow. The power is used to charge electrical systems connected to each generator.

The prior art fails to consider utilizing hydraulic power available in, for example, a climate control system, such as an Heating Ventilation and Air Conditioning (HVAC) system, disbursed throughout a multi-level building, for powering the building itself.

SUMMARY OF THE INVENTION

In view of the deficiencies in the prior art, it is an object of the invention to provide a process and system for harnessing hydraulic power available in a climate control system disbursed throughout a multi-level building.

It is a further object of the invention to use the harnessed power for powering the building itself.

In a conventional system, a cooling tower is disposed on a high end of the building structure, such as a rooftop, and the cooling tower is isolated from a chiller located in on an opposing, low end of the building structure, such as in a basement. The novel system is an improvement on the conventional system as it taps into and utilizes the potential energy of the water free-falling through the building, from the cooling tower to the chiller. The flow is intercepted with a synchronous hydro-turbine generator, near the bottom of the flow path and powers the generator. The generator generates electricity which is injected into the building electrical riser, creating a reduction in consumed electricity provided by the utility company.

BRIEF DESCRIPTION OF THE FIGURE

In order that the manner in which the above recited objectives are realized, a particular description of the invention will be rendered by reference to a specific embodiment thereof that is illustrated in the appended drawing. Understanding that the drawing depicts only a typical embodiment of the invention and is not therefore to be considered to be limiting of its scope, the invention will be described and explained with additional specificity and detail through the use of the accompanying drawing in which:

FIG. 1 illustrates an assembly view of an embodiment of the invention.

DETAILED DESCRIPTION OF THE INVENTION

Turning to the FIGURE, an assembly view of the embodiment illustrates such components of a condenser water loop, hereinafter also referred to as a main loop, in an HVAC system found in multi-level structures, such as office buildings, hospitals, and schools, which normally use at least one cooling tower 2 as part of their air conditioning systems. The cooling tower 2 is conventionally disposed on an elevated position, such as the roof of the multi-level structure, for transferring waste heat generated in the main loop 1 into the atmosphere.

Aside from the cooling tower 2, the main loop 1 of the illustrated HVAC system includes a chiller 3 cooled by exchanging heat with a fluid, such as water. The chiller 3 is connected to a secondary loop 4 in the HVAC system and functions to cool fluid traveling in the secondary loop in a manner known in the prior art.

On the left side of the FIGURE, a return side 5 of the main loop 1 of the HVAC system includes a condenser water return line 6 which connects the chiller 3 to the cooling tower 2. In the return line 6, a condenser water pump 7 pumps water between the chiller 3 and the cooling tower 2. The return side 5 also includes overfeed 8 and underfeed 9 lines connecting the return line 6 to the cooling tower 2.

On the right side of the FIGURE, a supply side 10 of the main loop of the HVAC system includes a cold water supply line 11. The supply line 11 connects the cooling tower 2 to the chiller 3. As illustrated, the supply water is gravity fed between the cooling tower 2 and the chiller 3.

The secondary loop 4 includes a chiller return line 12 which feeds the chiller 3. A supply line 13 directs cooled water away from the chiller 3. A chiller water pump 14 provides the pressure required for fluid in the supply line 13 to reach its destination equipment in the multi-level structure.

Turning back to the supply side 10 of the main loop of the HVAC system, a water driven turbine generator 15 is connected in the supply line 11. As is known, the energy extracted from the water in the supply line 11 depends on the flow volume and on potential energy of the fluid at the turbine generator 15, the potential energy being a function of the height difference between the cooling tower 2 and the location of the turbine generator 15.

The electrical energy generated by the generator 15 is transferred to a power supply, e.g., an electrical riser 16, for the multi-level structure. With this power transfer, hydraulic power available in the HVAC system 1, which is disbursed throughout a multi-level structure, powers the structure itself. That is, cooling tower 2 is disposed on a high end of the multi-level structure, such as the rooftop, and the cooling tower 2 is isolated from a chiller 3 located on an opposing, low end of the multi-level structure, such as in a basement. The illustrated system is an improvement on the conventional HVAC system as it taps into and utilizes the energy of the water free-falling through the multi-level structure from the cooling tower to the chiller. The flow is intercepted with the generator 15, near the bottom of the supply side 10 and powers the generator 15. The generator 15 generates electricity which is injected into the electrical riser 16, i.e., the power supply system, for the multi-level structure. This transfer reduces the consumption of electricity provided by the utility company.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

I claim:

1. A method of generating energy in a plural-level structure comprising:
   disposing a climate control system in or adjacent to said structure, said system comprising:
      a cooling tower;
      a fluid cooled chiller in a closed loop path with said cooling tower, fluid being gravity fed from said cooling tower to said chiller;
      a turbine generator disposed in said closed loop, said turbine generator being powered by the gravity fed fluid; and
   transferring power generated from said turbine generator to a power supply for said structure.

2. The method of claim 1, wherein said climate control system further comprises a condenser pump disposed in said closed loop for pumping fluid from said chiller to said cooling tower.

3. The method of claim 2, wherein said climate control system further comprises:
   a return line connecting an output of said chiller to an input of said cooling tower, said turbine being disposed in said return line; and
   a supply line connecting an output of said cooling tower to an input of said chiller, said pump being disposed in said supply line.

4. The method of claim 3, wherein the structure has an upper level and a lower level, and wherein said cooling tower is disposed on the upper level and said chiller is disposed in the lower level.

5. The method of claim 4, wherein the upper level is a roof of a building.

6. The method of claim 5, wherein the lower level is a basement of the building.

7. The method of claim 5, wherein the building is a commercial building including one or more of an office building, a hospital, a school, a hotel, and/or an arena.

8. The method of claim 5, wherein the building is a residential structure.

9. The method of claim 3, wherein the fluid is water.

10. The method of claim 3, wherein the climate control system is a heating, ventilation and air conditioning system.

11. A multi-level structure, comprising:
   a climate control system disposed in or adjacent to said structure, said climate control system comprising:
      a cooling tower;
      a fluid cooled chiller in a closed loop path with said cooling tower, fluid being gravity fed from said cooling tower to said chiller;
      a turbine generator disposed in said closed loop, said turbine generator being powered by the gravity fed fluid; and
   wherein, power generated from said turbine generator is transferred to a power supply for said structure.

12. The structure of claim 11, wherein said climate control system further comprises a condenser pump disposed in said closed loop for pumping fluid from said chiller to said cooling tower.

13. The structure of claim 12, wherein said climate control system further comprises:
   a return line connecting an output of said chiller to an input of said cooling tower, said turbine being disposed in said return line; and
   a supply line connecting an output of said cooling tower to an input of said chiller, said pump being disposed in said supply line.

14. The structure of claim 13, wherein the building has an upper level and a lower level, and wherein said cooling tower is disposed on the upper level and said chiller is disposed in the lower level.

15. The structure of claim 14, wherein the upper level is a roof of a building.

16. The structure of claim 15, wherein the lower level is a basement of the building.

17. The structure of claim 15, wherein the building is a commercial building including one or more of an office building, a hospital, a school, a hotel, and/or an arena.

18. The structure of claim 15, wherein the building is a residential structure.

19. The structure of claim 13, wherein the fluid is water.

20. The structure of claim 13, wherein the climate control system is a heating, ventilation and air conditioning system.

* * * * *